J. J. HESS.
PUMP.
APPLICATION FILED AUG. 11, 1913.

1,111,068.

Patented Sept. 22, 1914.

Witnesses
G. F. Tureshek
A. I. Hague

Inventor
Joseph J. Hess
by Orwig & Bair
attys.

UNITED STATES PATENT OFFICE.

JOSEPH J. HESS, OF NEW HAMPTON, IOWA.

PUMP.

1,111,068. Specification of Letters Patent. Patented Sept. 22, 1914.

Application filed August 11, 1913. Serial No. 784,427.

*To all whom it may concern:*

Be it known that I, JOSEPH J. HESS, a citizen of the United States, residing at New Hampton, in the county of Chickasaw and State of Iowa, have invented a certain new and useful Pump, of which the following is a specification.

The object of my invention is to provide a valve for pumps and the like of extremely simple, and durable construction.

More particularly it is my object to provide a pump with such a valve so constructed and arranged that it may be readily and easily taken apart for repairing or replacing parts and quickly and easily assembled for use.

Figure 1:
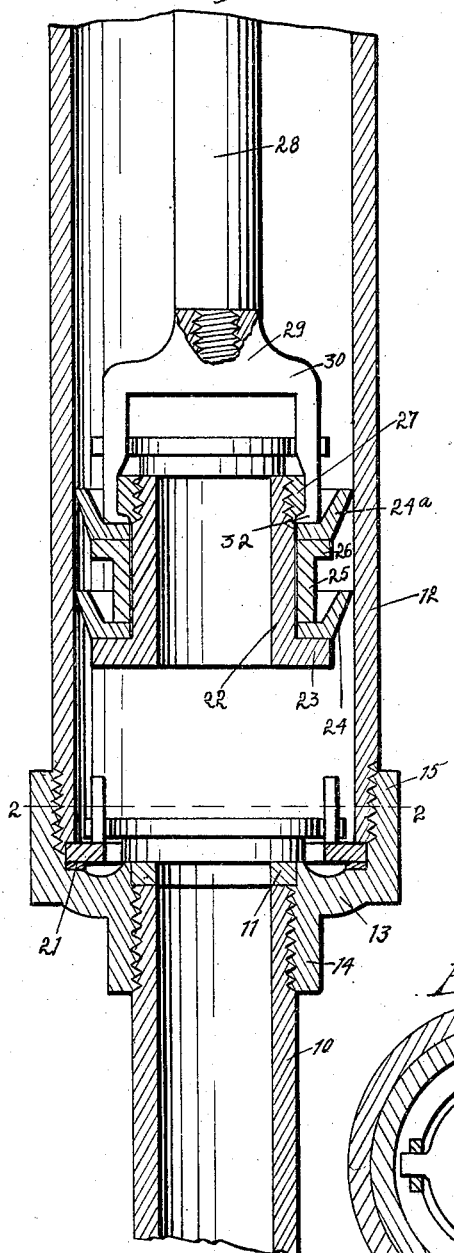
Figure 3:
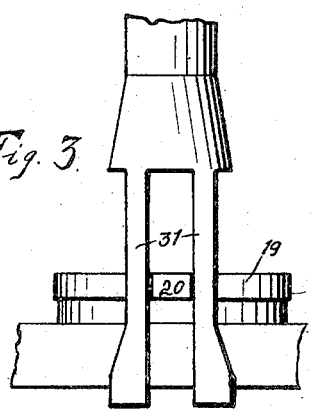
Figure 4:
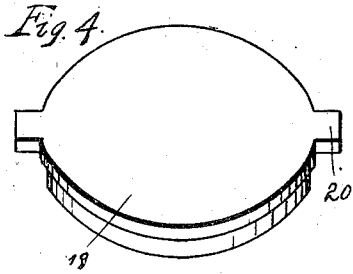
Figure 5:
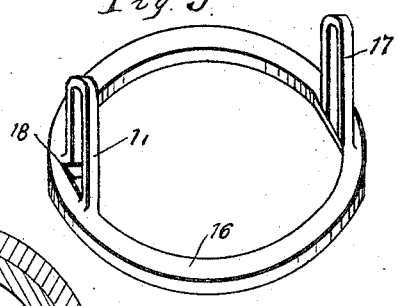
Figure 2:
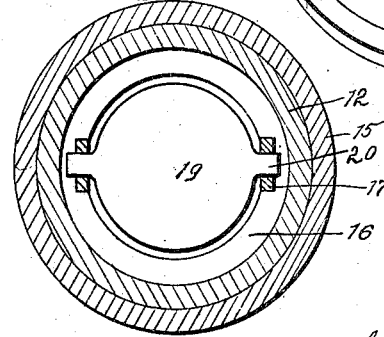

My invention consists in certain details, in the construction, arrangement and combination of the various parts of the device, whereby the objects contemplated are attained, as hereinafter more fully set forth, pointed out in my claims, and illustrated in the accompanying drawings, in which:

Figure 1 shows a vertical, sectional view through a pump cylinder equipped with valves embodying my invention. Fig. 2 shows a horizontal, sectional view taken on the line 2—2 of Fig. 1. Fig. 3 shows a side elevation of a portion of my valve. Fig. 4 shows a perspective view of the movable portion of the valve, and Fig. 5 shows a perspective view of one of the rings formed on which are the guide yokes.

In the accompanying drawings, I have used the reference numeral 10 to indicate generally a section of well pipe on the upper end of which is a valve seat 11. The pipe section 10 is connected with the pump cylinder 12 by means of a fitting 13 having the two cylindrical screw threaded portions 14 and 15 which are secured to the pipe 10 and the cylinder 12 respectively, as shown in Fig. 1. The lower portion of my improved valve comprises a ring 16 designed to rest upon the fitting 13 at the lower end of the cylindrical portion 15, and to be engaged by the lower end of the wall of the cylinder 12.

Near the inner edge of the ring 16, on opposite sides thereof, are upwardly extending guide yokes 17 having substantially the form of an inverted U. The inner portion of the ring 16 is cut away below one of the guide yokes 17 to form a notch 18, as shown in Fig. 5.

The movable portion of the valve comprises the valve proper 19 having on opposite sides laterally extending lugs 20 designed to be received between the arms of the guide yokes 17.

In assembling the lower portion of my improved valve, the cylinder 12 is unscrewed from the portion 15 of the fitting. I then preferably place on the fitting a gasket 21 of suitable material. One of the lugs 20 of the valve 19 is placed between the arms of the guide yokes 17 on the side of the ring 16 opposite the notch 18 and is slid toward the top of the guide yokes 17. The other lug 20 may then be moved up through the notch 18 until the valve is in horizontal position with the lugs 20 received between the arms of the guide yokes 17. The ring 16 is then placed on the gasket 21 and the cylinder 12 is screwed into the fitting 13.

The upper portion of my improved pump comprises a cylinder 22, the upper end of which forms a valve seat. At the lower end of the cylinder 22 is formed a circumferential, annular, outwardly extending flange 23. The cylinder 22 is of course received within the pump cylinder 12. Resting upon the flange 23 is an ordinary flexible valve member 24 which may be of leather or any other suitable material. Resting above the packing member 24 is a cylindrical collar 25 which holds the member 24 in position and has formed at its upper end a circumferential, annular, outwardly extending flange 26. Above the flange 26 is another packing member 24ª similar to the member 24.

The upper end of the cylinder 22 is externally screw threaded to receive the collar 27 having internal screw threads. Above the pump is the piston rod 28 to which is screwed a block 29 having opposite, laterally extending arms 30 formed on the ends of each of which are parallel, downwardly extending arms 31. On the lower ends of each downwardly extending arm 31 is an inwardly extending lug 32.

In assembling the piston of my improved pump, the packing member 24 is placed upon the cylinder 22 resting on the flange 23. The collar 25 is then placed in position and the packing member 24ª is placed on the cylinder 22 resting upon the flange 26. The block 29 may then be screwed on to the piston rod 28.

For the piston, I provide a valve 19 having opposite, laterally extending lugs 20 similar to those of the lower valve. The lugs 20 of the upper valve 19 are placed between the pairs of arms 31 on each side of the block 29 by tipping the valve 19 until the lugs enter the spaces between the respective pairs of arms 31, and then the valve is moved to horizontal position. The lower ends of the arms 31 are placed in position resting upon the valve member 24ª, and the collar 27 is screwed on to the upper end of the cylinder 22. The upper portion of the valve is then inserted into the pump cylinder 12 and the valve is ready for use.

My improved pump has a number of advantages: It is of very simple, durable and inexpensive construction. On account of its extreme simplicity, it is easy to assemble or take apart, and it therefore is a pump which is easy to repair.

I claim as my invention:

1. In a device of the class described, the combination of a pipe, a valve seat formed thereon, a fitting mounted on said pipe, a cylinder detachably secured to said fitting, a ring mounted between said fitting and said cylinder, said ring having at its inner edge on opposite sides upwardly extending guide yokes closed at their upper ends, said ring being also provided with a notch beneath one of said guide yokes, and a valve designed to coöperate with said seat, said valve having formed on opposite sides laterally extending lugs, said lugs being received between the arms of said guide yokes.

2. In a device of the class described, a cylinder screw threaded at its upper end, a collar mounted on said screw threaded portion, a block having on opposite sides downwardly extending bifurcated arms, said arms being provided with inward extensions, the arms on the opposite sides of said block receiving the said collar, said extensions being below said collar, means for preventing downward movement of said arms with relation to said collar, and a valve designed to coact with the upper end of said cylinder, said valve being provided on opposite sides with laterally extending lugs received between the bifurcated arms on the opposite sides of said block.

3. In a device of the class described, a cylinder having a valve seat formed at its upper end and having a circumferential, annular, outwardly extending flange at its lower end, a flexible packing member resting upon said flange, a cylindrical collar resting upon said flexible packing member, a second flexible packing member resting upon said collar, a block designed to be secured to a piston rod, said block having on opposite sides downwardly extending bifurcated arms, said arms having inward extensions at their lower ends, said extensions resting upon the upper flexible packing member, and a collar detachably mounted on the upper end of said cylinder above the said extension, and a valve having laterally extending lugs formed on opposite sides and received between the members of said bifurcated arms.

Des Moines, Iowa, July 25, 1913.

JOSEPH J. HESS.

Witnesses:
C. A. LARSON,
TIM DONOVAN.